(12) United States Patent
Bieg et al.

(10) Patent No.: US 11,341,077 B2
(45) Date of Patent: May 24, 2022

(54) METHOD FOR THE ASSIGNMENT OF ADDRESSES BY A MASTER UNIT TO A NUMBER OF SLAVE UNITS

(71) Applicant: VITESCO TECHNOLOGIES GMBH, Hannover (DE)

(72) Inventors: Bernhard Bieg, Regensburg (DE); Klaus-Dieter Schneider, Lappersdorf (DE); Alfons Fisch, Falkenstein (DE); Andreas Wunderlich, Wenzenbach (DE)

(73) Assignee: Vitesco Technologies GmbH, Hannover (DE)

( * ) Notice: Subject to any disclaimer, the term of this patent is extended or adjusted under 35 U.S.C. 154(b) by 490 days.

(21) Appl. No.: 16/321,483

(22) PCT Filed: Aug. 1, 2017

(86) PCT No.: PCT/EP2017/069462
§ 371 (c)(1),
(2) Date: Jan. 29, 2019

(87) PCT Pub. No.: WO2018/024738
PCT Pub. Date: Feb. 8, 2018

(65) Prior Publication Data
US 2021/0286751 A1  Sep. 16, 2021

(30) Foreign Application Priority Data
Aug. 4, 2016 (DE) .......................... 102016214416.2

(51) Int. Cl.
*G06F 13/42* (2006.01)
*G06F 13/362* (2006.01)
*G06F 13/40* (2006.01)

(52) U.S. Cl.
CPC ........ *G06F 13/4282* (2013.01); *G06F 13/362* (2013.01); *G06F 13/404* (2013.01)

(58) Field of Classification Search
CPC ..................................................... G06F 17/14
See application file for complete search history.

(56) References Cited

U.S. PATENT DOCUMENTS 5,914,957 A    6/1999  Dean et al.
7,761,633 B2 *  7/2010  Devila ................ G06F 13/4291
                                                    710/110

(Continued)

FOREIGN PATENT DOCUMENTS

CN    101635637 A    1/2010
CN    102012885 A    4/2011

(Continued)

*Primary Examiner* — Henry Tsai
*Assistant Examiner* — Juanita Borromeo
(74) *Attorney, Agent, or Firm* — Laurence A. Greenberg; Werner H. Stemer; Ralph E. Locher

(57) ABSTRACT

A method assigns addresses from a master unit to a number of slave units. The slave units are connected to the master unit for the transmission of information. An address output of the master unit is connected to an address input of a first slave unit and the address output of an n-th slave unit is connected to the address input of an n+1-th slave unit. The slave units, when a first level is applied to their address input, set the level at their address output to the first level and change to the first, "non-addressed" state, in the event of a transition of the level at their address input from the first level to a second level, change to the "addressable" state, upon receiving an address from the master unit, check the received address for validity in the "addressable" state and, acknowledge the reception to the master unit.

2 Claims, 2 Drawing Sheets

(56) References Cited

U.S. PATENT DOCUMENTS

| | | | |
|---|---|---|---|
| 9,880,950 B2 * | 1/2018 | Sauer | ................ H04L 61/2038 |
| 10,230,657 B2 | 3/2019 | Schmoetzer et al. | |
| 2009/0144471 A1 | 6/2009 | Lin | |
| 2018/0150430 A1 | 5/2018 | Bieg et al. | |

FOREIGN PATENT DOCUMENTS

| | | | |
|---|---|---|---|
| CN | 103825789 A | 5/2014 | |
| CN | 105511340 A | 4/2016 | |
| DE | 3736081 A1 | 5/1989 | |
| DE | 19756564 A1 | 6/1998 | |
| DE | 102005014124 A1 | 9/2006 | |
| DE | 102009007109 A1 | 8/2010 | |
| DE | 102011053471 A1 | 3/2013 | |
| DE | 102015214133 A1 | 2/2017 | |

* cited by examiner

METHOD FOR THE ASSIGNMENT OF ADDRESSES BY A MASTER UNIT TO A NUMBER OF SLAVE UNITS

BACKGROUND OF THE INVENTION

Field of the Invention

In the case of these serial bus systems for device-internal communication, which are usually master/slave bus systems, the bus subscribers must have a unique address.

The address assignment is usually static. In this case, the address is either programmed by the manufacturer of the slave module, is read in via address pins upon starting or is programmed during the end-of-line programming of the printed circuit board.

DE 10 2015 214 133.0 (not pre-published) describes addressing via address pins, wherein the number of pins must be provided according to the number of slave units to be connected to the bus.

All of the solutions mentioned above are not optimal. The programming by the manufacturer is inflexible and the address pins require a corresponding number of additional pins on the respective slave units. End-of-line programming requires production time and a customer-specific programming solution.

SUMMARY OF THE INVENTION

The object of the invention is therefore to state a method for the assignment of addresses by a master unit to a number of slave units, which method can be carried out with a minimum of additional lines.

The object is achieved by means of a method as claimed in claim 1. An advantageous embodiment is stated in the subclaim.

In a method according to the invention for the assignment of addresses by a master unit to a number K of slave units, wherein the slave units are connected to the master unit via a serial bus for the bidirectional transmission of information and each have an address input and an address output, wherein an address output of the master unit is connected to the address input of a first slave unit and the address output of an n-th slave unit—with n=1 to K−1—is connected to the address input of an n+1-th slave unit, the following steps are carried out:

when a first level is applied to their address input, the slave units likewise set the level at their address output to the first level and change to the first, "non-addressed" state, in the event of a transition of the level at their address input from the first level to a second level, they change to the "addressable" state, upon receiving an address from the master unit, they check the received address for validity in the "addressable" state and, in the event of a positive checking result, acknowledge the reception to the master unit and change to the "addressed" state and set the level at their address output to the second level.

The master unit transmits an address to a respective slave unit until it has received an acknowledgement from the respective slave unit and, after receiving the acknowledgement, transmits a next address to the next slave unit.

In one embodiment of the invention, the first level is a high level and the second level is a low level.

As a result of the method according to the invention, any desired addresses can be allocated and there is no need for any additional circuits in the master unit or in a slave unit such as analog/digital or digital/analog converters.

The invention is explained in more detail below on the basis of an exemplary embodiment with the aid of figures.

DESCRIPTION OF THE INVENTION

Figure 1:
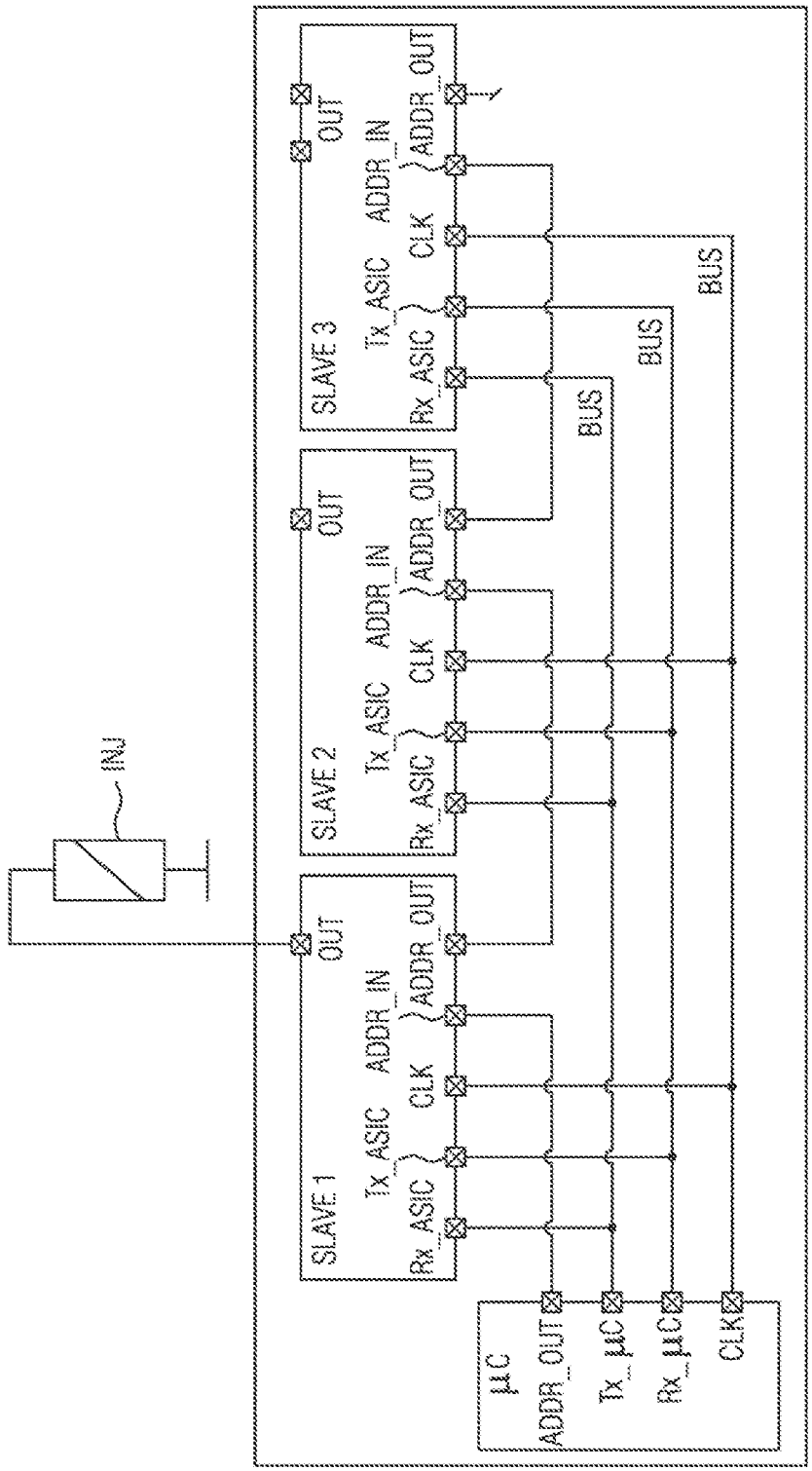
FIG. 1 shows a block diagram for carrying out a method according to the invention.

The block diagram in FIG. 1 shows a typical configuration of a control unit in a motor vehicle having a microcontroller µC which is connected to a number of slave units slave 1, slave 2, slave 3 by means of a serial bus. In this case, the microcontroller µC is used as the master unit and has a transmission output Tx_µC, a receiving input Rx_µC, a clock output CLK and an address output ADDR_OUT.

The slave units slave 1, slave 2, slave 3 likewise each have a transmission output Tx_ASIC, a receiving input Rx_ASIC and an address output ADDR_OUT, but additionally also a clock input CLK, an address input ADDR_IN and one or more outputs OUT.

They are connected to the microcontroller µC via a bus, wherein a respective receiving input Rx_ASIC of a slave unit slave 1, slave 2, slave 3 is connected to the transmission output Tx_µC of the microcontroller µC, a respective receiving input Rx_ASIC of a slave unit slave 1, slave 2, slave 3 is connected to the transmission output Tx_µC of the microcontroller µC and a respective clock input CLK of a slave unit slave 1, slave 2, slave 3 is connected to the clock output CLK of the microcontroller µC.

The address output ADDR_OUT of the microcontroller µC is connected to the address input ADDR_IN of the first slave unit slave 1. The address output ADDR_OUT of the latter is connected to the address input ADDR_IN of the second slave unit slave 2 etc. In this manner, in the case of K slave units, the address output ADDR_OUT of an n-th slave unit can be respectively connected to the address input ADDR_IN of an n+1-th slave unit, with n=1 to K−1. The address outputs and inputs are therefore connected to one another in the form of a daisy chain.

The method according to the invention can be carried out with such a connection of a microcontroller µC to any desired number of slave units.

During each system start, for example after a RESET, the microcontroller µC as the master unit assigns the addresses to the connected slave units slave 1, slave 2, slave 3. Each slave unit slave 1, slave 2, slave 3 can assume or change itself to the "non-addressed", "addressable", "receive address" and "addressed" states.

Figure 2:
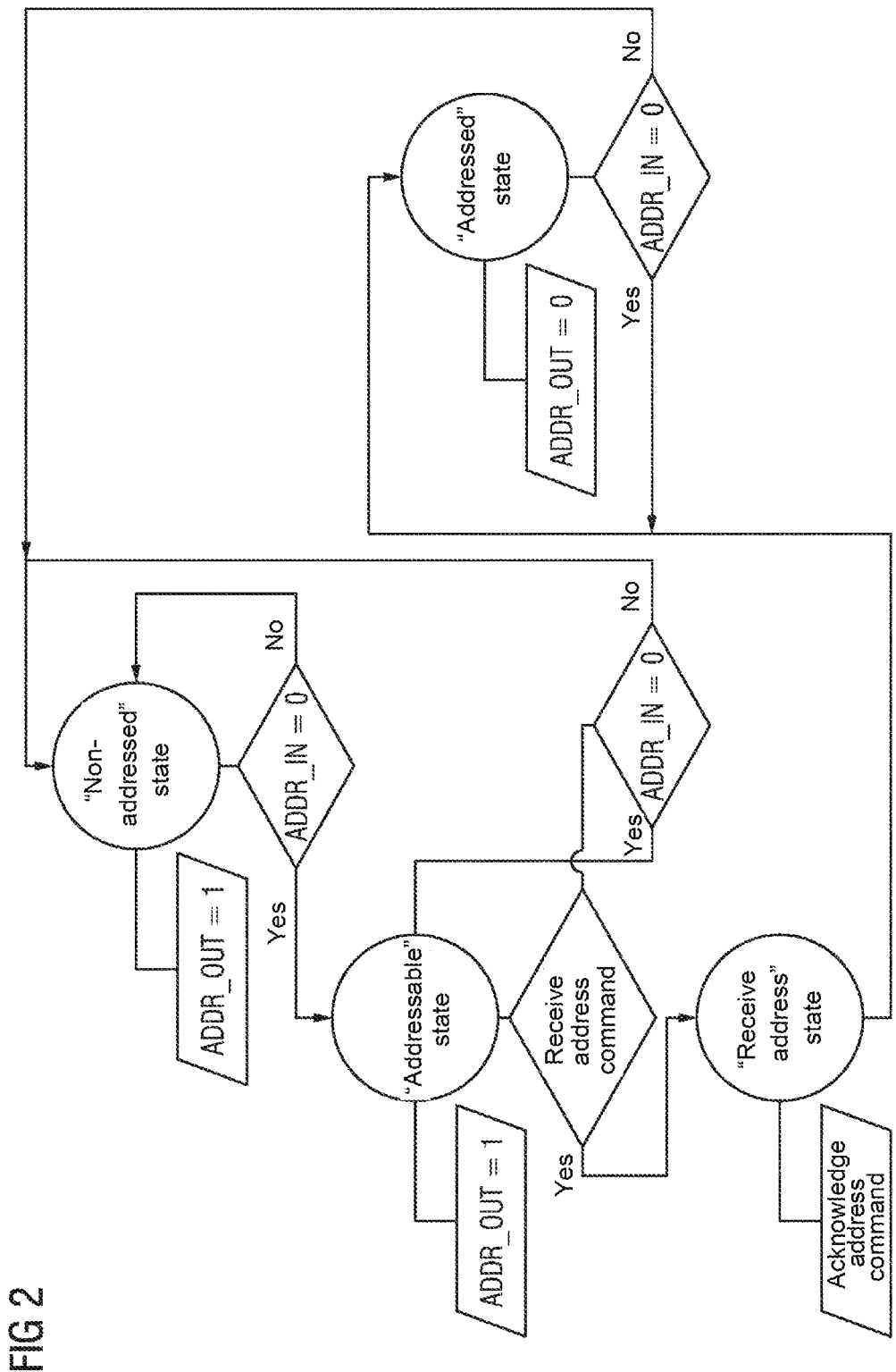
FIG. 2 shows a flowchart of a method according to the invention.

FIG. 2 shows the states and state transitions in the form of a flowchart or the state machine in a slave unit slave 1, slave 2, slave 3. The address input ADDR_IN, the address output ADDR_OUT and the serial bus interface of a slave unit slave 1, slave 2, slave 3 with the receiving Rx_µC, Rx_ASIC, transmission Tx_µC, Tx_ASIC and clock inputs and outputs CLK are used to control the states.

In order to start the system, the microcontroller µC sets its address output ADDR_OUT. Each slave unit slave 1, slave 2, slave 3 which receives a logical "1" at its address input ADDR_IN then changes to the "non-addressed" state and likewise sets its address output ADDR_OUT to a logical "1". All slave units slave 1, slave 2, slave 3 therefore change to the "non-addressed" state in this manner and wait for the reception of the address command.

The microcontroller μC now starts to allocate an address to the first slave unit slave 1. For this purpose, it sets its address output ADDR_OUT to a logical "0", whereupon the first slave unit slave 1 changes to the "addressable" state.

A slave unit accepts address commands only in the "addressable" state and ignores them in all other states. The microcontroller μC now transmits an address command containing the address, and the first slave unit slave 1 changes to the "receive address" state.

If the first slave unit slave 1 has not received the address command, it remains in the "addressable" state and the microcontroller μC continues to transmit address commands. In the "receive address" state, the first slave unit slave 1 checks the address. If the address is valid, the first slave unit slave 1 acknowledges the address command and changes to the "addressed" state.

If the microcontroller μC does not receive an acknowledgement after transmitting the address command, it starts to transmit an address command again.

In the "addressed" state, the first slave unit slave 1 sets its address output ADDR_OUT to a logical "0". The second slave unit slave 2 now changes to the "addressable" state and the microcontroller μC can allocate an address to the second slave unit slave 2. The sequence continues until all slave units slave 1, slave 2, slave 3 are in the "addressed" state and have acknowledged this. If all slave units slave 1, slave 2, slave 3 have received their address, the network is ready for communication.

As a result of the method according to the invention, all slave units in a master/slave bus system can be allocated an address by the master. In this case, there are no restrictions whatsoever in the number of slave units and the addresses are freely selectable. In this case, the number of required lines is minimal and there is no need for any complex additional hardware in the master unit or in a slave unit. The method can therefore be implemented with minimum costs and has maximum flexibility. In this case, a slave unit may be any type of peripheral component, for example an EEPROM (Electrically Erasable Programmable Read Only Memory), an RTC (Real Time Clock) or any desired ASIC (Application Specific Integrated Circuit).

The invention claimed is:

1. A method for assigning addresses from a master unit to a plurality K of slave units, which comprises the steps of:
    connecting the slave units to the master unit via a serial bus for a bidirectional transmission of information and each of the slave units and the master unit having an address input and an address output;
    connecting the address output of the master unit to the address input of a first slave unit of the slave units and the address output of an n-th slave unit of the slave units, with n=1 to K−1, is connected to the address input of an n+1-th slave unit of the slave units, in which the slave units, when a first level is applied to the address input, set a level at the address output to the first level and change to a first, "non-addressed" state, and in an event of a transition of a level at the address input from the first level to a second level, change to an "addressable" state;
    checking, upon receiving an address from the master unit, the address received for validity in the "addressable" state and, in an event of a positive checking result, acknowledge a reception to the master unit and change to an "addressed" state and set the level at the address output to the second level; and
    transmitting, via the master unit, the address to a respective slave unit of the slave units until the master unit receives an acknowledgement from the respective slave unit and, after receiving the acknowledgement, transmitting a next address to a next one of the slave units;
    wherein each one of a plurality of the slave units can be placed into the "addressable" state, but only one of the plurality of slave units is placed into the "addressable" state at a given time; and
    wherein an address of the one of the plurality of slave units is only changeable when the one of the plurality of slave units is in the "addressable" state.

2. The method according to claim 1, wherein the first level is a high level and the second level is a low level being lower than the first level.

* * * * *